United States Patent
Czotscher et al.

(10) Patent No.: US 7,663,771 B2
(45) Date of Patent: Feb. 16, 2010

(54) CONTROL METHOD AND DEVICE, AND METHOD FOR SETTING UP A CONTROL SYSTEM

(75) Inventors: Andreas Franz Czotscher, Ochsenfurt (DE); Helmut Geiger, Großrinderfeld-Gerchsheim (DE); Stefan Anton Giesel, Oberthulba (DE); Thomas Hüller, Karlstadt (DE); Jürgen Herbert Mees, Kürnach (DE); Armin Bernhard Rath, Erlabrunn (DE); Mirko Theodor Roman Römling, Veitshöchheim (DE)

(73) Assignee: Koenig & Bauer Aktiengellschaft, Wurzburg (DE)

( * ) Notice: Subject to any disclaimer, the term of this patent is extended or adjusted under 35 U.S.C. 154(b) by 841 days.

(21) Appl. No.: 10/539,885

(22) PCT Filed: Dec. 11, 2003

(86) PCT No.: PCT/DE03/04099

§ 371 (c)(1),
(2), (4) Date: Jun. 16, 2005

(87) PCT Pub. No.: WO2004/055609

PCT Pub. Date: Jul. 1, 2004

(65) Prior Publication Data

US 2006/0101043 A1 May 11, 2006

(30) Foreign Application Priority Data

Dec. 16, 2002 (DE) .................. 102 58 704
Apr. 14, 2003 (DE) .................. 103 17 065

(51) Int. Cl.
*G06F 3/12* (2006.01)
*G06K 15/00* (2006.01)

(52) U.S. Cl. .............. 358/1.15; 358/1.1; 358/1.16
(58) Field of Classification Search .......... 358/1.1, 358/1.9, 1.11, 1.12, 1.13, 1.14, 1.15, 1.16, 358/1.17, 1.18; 707/101, 102; 717/108, 717/116, 174

See application file for complete search history.

(56) References Cited

U.S. PATENT DOCUMENTS 4,847,775 A 7/1989 Roch et al.

(Continued)

FOREIGN PATENT DOCUMENTS

DE 37 07 866 A1 10/1987

(Continued)

OTHER PUBLICATIONS

"Useware in der Praxis: Die DIC0web Bedienung—ein Beispiel fur eine ergonomische Gestaltung in der Drucktechnik," 44 (2002) Heft 9 atp pp. 78-81; Gregor Enke.

(Continued)

*Primary Examiner*—Thierry L Pham
(74) *Attorney, Agent, or Firm*—Jones, Tullar & Cooper, P.C.

(57) ABSTRACT

A device is used for controlling an installation that is comprised of several units. A common control system, that is provided with a central data memory, in which current real values and/or set points are filed as process variables for several units, is allocated to several of these units. The data memory encompasses a storage area for the process variables. The data structure of this storage area can be configured even by using a set of data that describes the projected installation.

23 Claims, 4 Drawing Sheets

U.S. PATENT DOCUMENTS

| | | |
|---|---|---|
| 5,625,758 A | 4/1997 | Schneider et al. |
| 5,937,149 A | 8/1999 | Lindner et al. |
| 6,882,890 B2 | 4/2005 | Horn et al. |
| 2002/0049959 A1 | 4/2002 | Horn et al. |
| 2004/0073680 A1 | 4/2004 | Bauer et al. |
| 2004/0117399 A1* | 6/2004 | Dittmar et al. ............. 707/102 |
| 2004/0168150 A1* | 8/2004 | Ziv ........................... 717/116 |

FOREIGN PATENT DOCUMENTS

| | | |
|---|---|---|
| DE | 197 40 974 A1 | 3/1999 |
| DE | 199 45 686 A1 | 3/2001 |
| DE | 100 38 552 A1 | 2/2002 |
| DE | 101 01 745 A1 | 8/2002 |
| EP | 0 543 281 A1 | 11/1992 |
| EP | 1 182 528 A2 | 2/2002 |
| EP | 1 249 747 A1 | 10/2002 |

OTHER PUBLICATIONS

"Simadyn D, ein schnelles digitales Regel—und Steuersystem," Siemens Energie & Automation 8 (1986) Heft 2; pp. 112-115 Jurgen Siebert.

"Simadyn D, modulare Hardware-Struktur ermoglicht optimale Anpassung," Hans-Dieter Schafer; Siemens Energie & Automation 8 (1986) Heft 2; pp. pp. 116-118.

"Modulare System-Software, der Schlussel zum einfachen Umgang mit Simadyn D"; Gunther Prade; Siemens Energie & Automation 8 (1986) Heft 2; pp. 119-120.

"Struc, die anwendergerechte Projektierungssprache fur due Antriebs-und Stromrichter—regelungstechnik mit Simadyn D"; Horst Eisenack; Siemens Energie & Automation 8 (1986) Heft 2; pp. 121-123.

"Verteilte Systeme, Verteilte Objeckte-DCOM," Seminar Datenverar-beitung WS 1998/99; pp. 1-20.

* cited by examiner

CONTROL METHOD AND DEVICE, AND METHOD FOR SETTING UP A CONTROL SYSTEM

CROSS-REFERENCE TO RELATED APPLICATIONS

This patent application is the U.S. national phase, under 35 USC 371, of PCT/DE2003/004099, filed Dec. 11, 2003; published as WO 2004/055609 A2 and A3 on Jul. 1, 2004, and claiming priority to DE 102 58 704.3, filed Dec. 16, 2002, and to DE 103 17 065.0, filed Apr. 14, 2003, the disclosure of which are expressly incorporated herein by reference.

FIELD OF THE INVENTION

The present invention is directed to a method and to a device for control, as well as to a method for setting up a control system. The control system is intended primarily to be used in conjunction with a printing press.

BACKGROUND OF THE INVENTION

DE 37 07 866 A1 discloses a control device for use with several units of a printing press. Values, which are measured at the units, are supplied to a computer unit, are stored in a memory and are made visible at a touch display screen. The direct control of the units is made possible by the use of the touch screen and the computer unit.

A digital system for use in regulating and controlling a power converter and drive mechanisms is known from the publication "Siemens Energie & Automation 8 (1986) Heft 2", pages 119 and 120. A regulating and control device is designed by the use of design software, instead of being programmed. The designed regulation and control functions of this regulating device are translated into a list code. The application program is processed, together with the system software, by the regulating and control device. The regulating device is designed in a structural image-oriented design language of required hardware and software components, as discussed at pages 121 to 123 of the above-identified publication.

A system for the rapid digital regulation and control of power converter drive mechanisms is disclosed in the above mentioned publication on pages 112 to 115. The hardware and software is constructed in modular structures, as discussed at pages 116 to 118.

DE 197 40 974 A1 discloses a book production system with a program having an object structure and a memory, in which, inter alia, information regarding the machinery contained in the installation, as well as setting parameters, are stored. To manufacture a defined product, the setting parameters required for this product are output to the control of the machine by the program by the use of the data stored in the data bank.

A system for transmitting OPC data via the internet to an OPC server of an automating system is known from DE 100 36 552 A1.

An article by Wolfgang Weber "Verteilte Systeme—Verteilte Objekte—DCOM" presented at a seminar on data processing WS 1989/99 of the Ruhr University at Bochum, Chair for Data Processing, deals with the employment of DCOM running time systems in connection with the communication between several different computers and processes.

In an article entitled "Useware in der Praxis: Die DICOweb Bedienung—ein Beispiel für eine ergonomische Gestaltung in der Drucktechnik" by Gregor Enke, 44 (2002), an operating concept for a printing press is introduced. The concept provides a manipulation-oriented operation in the course of the product preparation and the influencing of process values.

SUMMARY OF THE INVENTION

The object of the present invention is directed to providing a method and a control system, as well as a method for setting up a control system.

In accordance with the present invention, this object is attained by the provision of a device for controlling a printing press. The printing press includes several units. These units are controlled by a common control system which has a central data memory in which actual values are stored in the form of process variables.

The advantages to be gained by the present invention consist, in particular, in that for one the architecture of the control system is constructed in a decentralized manner in such a way that it supports a modular and a flexible construction or design of the processing machine.

Simultaneously, there is a central data management device whose structure is adapted from the existing configuration of the processing machine, or which reflects it. This makes possible a simple, centralized configuration across distributed systems.

The central data management system and/or the architecture of the control system in accordance with the present invention, form a scaleable system. In this way, the individual steps for processing the data can be scaled on a single computer or across several computers, depending on the application case and/or the workload. Therefore, the system, and in particular the software and the hardware of the system, covers a large spectrum of different types and sizes of machines, such as, for example, printing presses for newspapers, jobbing, sheets, securities and the like. The software, or the data inventory of the control system, is configured as a function of the type of application, such as, for example, being designed from predefined modules and data inventories. Separate programming of data of each individual configuration can be omitted. Only the design of the control system with previously known components to correspond with the installation takes place. The modular architecture and the type of planning and implementation can be advantageously expanded to installations with several sections.

Regarding the variability and the flexible application for the most diverse machine types, the standardized, almost automated design of the control system, and in particular of the data memory, is of particular advantage. The program portion of the data server, which is identical to a large extent, except with regard to different types of machines, forms the machine-specific structure in the data server actually on the basis of a data set describing the installation, i.e. the data server only receives its identity, for example through its memory element which was previously "empty", with respect to the installation to be controlled, and is set up accordingly. This set-up of the base structure can be followed during the later operation, in the course of operating the installation, by a change of applied parameter specifications and/or an activation or a deactivation of basically provided components, or units. In what follows, a differentiation will be made between the implementation, i.e. between the data or software configuration of the machine-specific data structure into the control system, and an adaptation, to be made during the running of the installation, to the product to be manufactured, which adaptations are, in part, also called "configuring" or "setting-up" in the prior art. For example, control console computers, or their memories, have a fixedly programmed identifier space when the installation is being delivered. With the present system, there is a freely programmable identifier space, whose data structure, for example by implementing the config files, is only then set up. For this purpose, the data server has a process on the one side, and on the other side has the config file, which is characterizing the installation.

In an advantageous embodiment of the control console in accordance with the present invention, the control console has an operating console which makes it possible for the operator to recognize the colors of the actual side and to change them. In a further development of the invention, the values for regulating and for controlling the machine can be directly changed or can be input by the use of a touch screen-capable display field at the display screen.

BRIEF DESCRIPTION OF THE DRAWINGS

Preferred embodiments of the present invention are represented in the drawings and will be described in greater detail in what follows.

Shown are in:

FIG. 1, a schematic installation with a control device, in

DESCRIPTION OF THE PREFERRED EMBODIMENT

Figure 1:
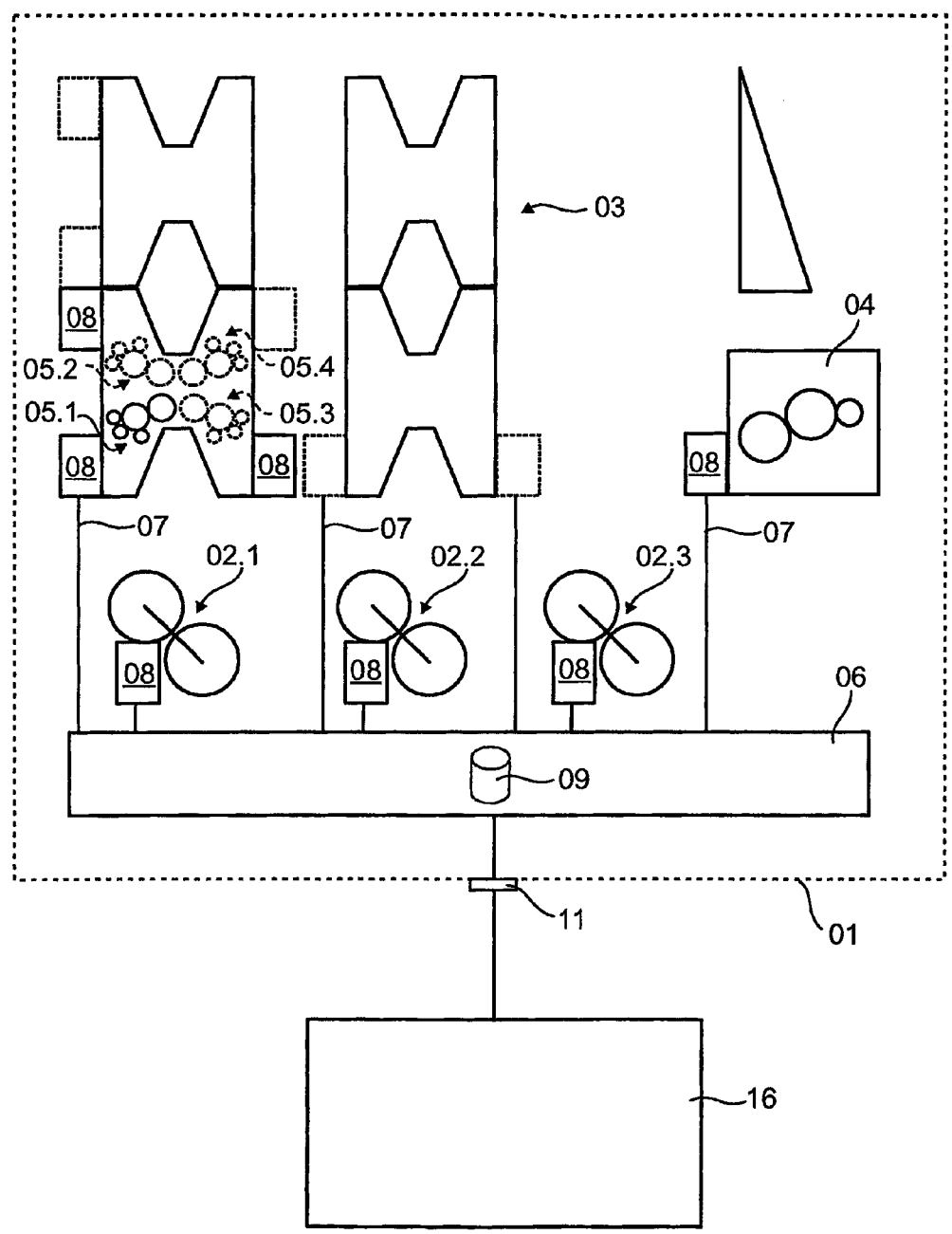

An installation 01, such as, for example, a printing press 01 or a printing press installation 01 as represented in FIG. 1, has a number of units 02, 03, 04, for example installation elements for performing defined method steps, such as a material supply device 02, for example a roll changer 02, or several roll changers 02.1, 02.2, 02.3, printing units of printing towers 03, units 04 for further processing, such as folding apparatus 04, and the like. In turn, each of the printing units 03 can have several lower-order units 05, such as, for example printing groups 05, identified by 05.1, 05.2, 05.3, 05.4, etc. The different units 02, 03, 04, 05 can each be provided once or several times in the installation. The number and/or the embodiment of the several units 02, 03, 04, 05 can be different for different embodiments of the installation.

The installation 01 furthermore has a symbolically represented control system 06, which controls the units 02, 03, 04, 05, or which controls their drive mechanisms, settings, etc. individually and in the interaction between each other. The symbolically represented control system 06 contains, as will be explained in detail below, various elements, such as one or several memories, one or several computing units, as well as signal connections between the elements, such as data busses and/or protocol converters, for example. The control system 06 is in a signal connection, such as, for example via connections 07, with the units 02, 03, 04, 05. Alternatively, the control system 06 is in signal connection with controls 08 and/or with regulating elements 08 assigned to these units.

Depending on its type, configuration or application, such an installation 01 is differently configured with respect to its units 02, 03, 04, 05, with respect to the number of units and/or with respect to the detailed specification of the hardware of the units themselves. This means that this invention relates, for example, to a jobbing printing press with a defined number of roll changers of a defined type, to a defined number of printing groups in a horizontal arrangement of a defined type, to a folding apparatus of a defined type, and the like. In connection with the hardware, it is intended here to understand that the configuration of the installation 01 is the actual configuration of the installation with actually provided units 02, 03, 04, 05, and possibly their design.

Information regarding the actual configuration of the entire, actually existing installation 01 is centrally stored, with the corresponding data, in the control system 06. The data is preferably centrally stored in a centralized data management device 09, such as, for example a memory 09 or a data server 09. In an advantageous embodiment, these data for configuring the installation can be implemented and/or can be changed via at least one input interface 11. In an advantageous embodiment of the present invention, the data for configuring the installation are provided as a data set F, for example a file F, in particular configuration file F by the use of a data processing unit 16, which is independent of the control system 06, for example a computer 16 and, following their completion, are transmitted via the input interface 11 to the central data management device 09, or are implemented there. The preparation of the configuration file F is used for the mapping by use of control technology of the actual installation configuration and will be understood in what follows as "projecting" the control system 06 in view of the actually existing installation 01, or its units 02, 03, 04, 05. For example, the transmission of the file F can also take place from the manufacturer via a network, such as, for example, via the internet. However, the control system 06 can also have its own mechanism for projecting the control system 06, or for the preparation of the data set F which, for example, substantially correspond to those of the data bank and/or the surface which is explained in greater detail below.

The mapping of the configuration in a configuration file F, i.e. the projection of the control, takes place, in an advantageous embodiment of the present invention, by using a memory unit 17, and in particular by using a data bank 17, with a stock of pre-known or predefined objects 12, 13, 14, which objects are, for example, assigned to printing press types and/or to embodiments of the above mentioned units 02, 03, 04, 05. The installation 01, such as, for example, a printing press 01, is then projected in such a way that it is put together from the stock of predefined objects 12, 13, 14, such as, for example, printing towers, roll changers, folding apparatus, etc., wherein the data, or at least the basic data, properties and/or sub-programs, which are required for later operation of the installation 01, are assigned to these objects 12, 13, 14, or are allotted to them by selection. For example, these specific data and sub-programs are present in the data bank 17 and are linked to the respective object 12, 13, 14. More complex objects 12, 13, 14 at least contain the possibility of further details, in which lower-order objects 13.1, 13.2, for example specific variants, specific embodiments, details, specific settings, etc., here for the example of a "printing unit1", "printing group1" and printing group2", on a lower level are assigned to the objects 12, 13, 14, for example in the manner of a tree structure or a register structure.

Figure 2:
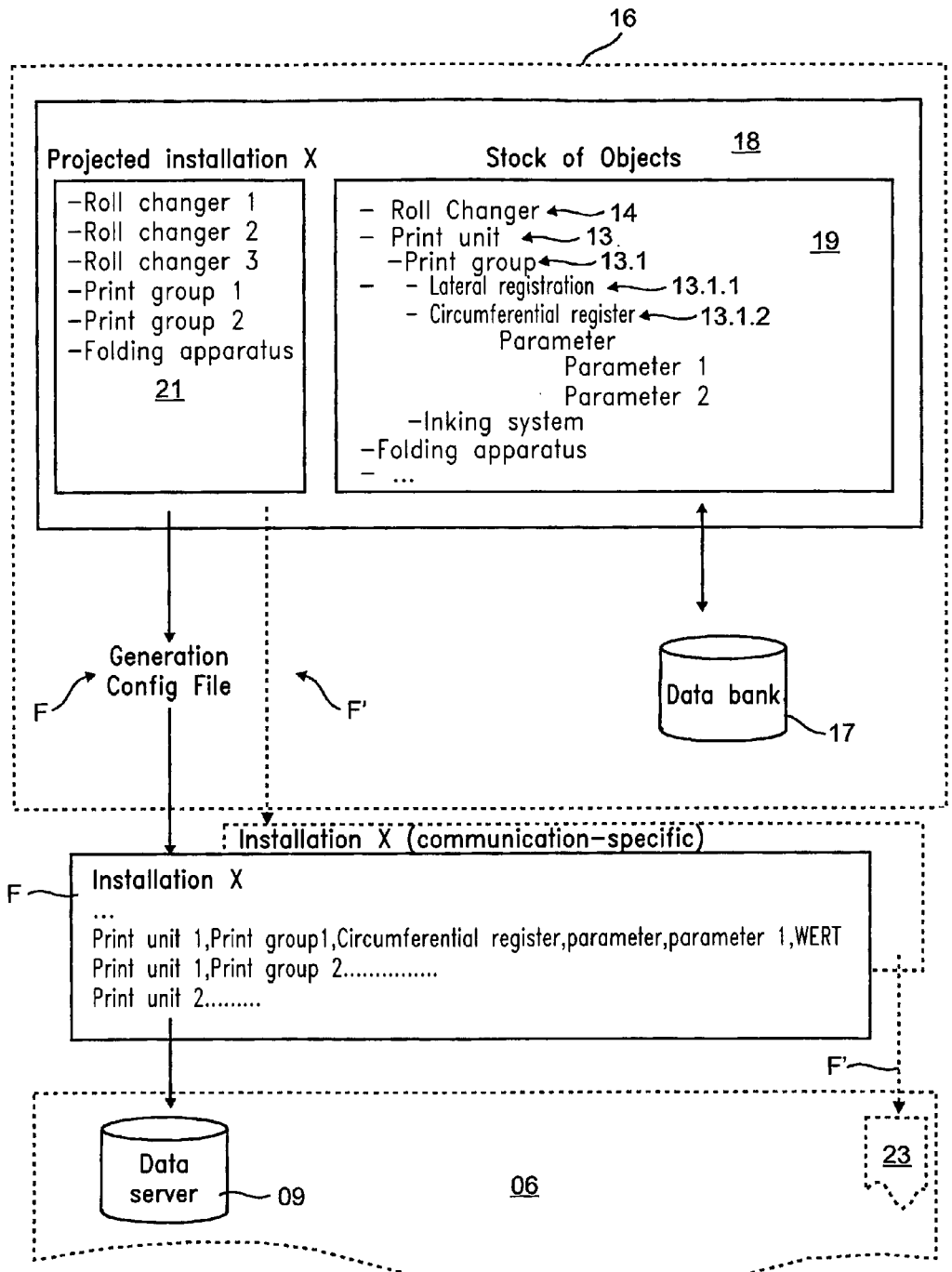
FIG. 2, a schematic representation of the design of an installation in accordance with the present invention, in FIG. 3, a schematic representation of the architecture of the control device of the present invention, and in FIG. 4, a schematic representation of the architecture of a multi-section installation in accordance with the present invention.

Further details can exist on more than one lower level in the tree structure, as represented in FIG. 2, for the example of the printing unit 03 with "lateral registration" and with "circumferential registration", as 13.2.1, 13.2.2. A further, not specifically identified level represents, for example, "parameters", with still lower located "parameter1" and "parameter2". Basic data and/or basic sub-programs are assigned to all these specifications in the data bank 17 which, when selecting the appropriate object 12, 13, 14, with sub-specification, lower-order objects, etc., are transferred to a data set F. Data, or finally selected parameters, can be differently selected for different units 02, 03, 04 of the same type, or can be predetermined by being entered. As represented, by way of example in FIG. 2, the installation 01, which is to be projected, by the use of software technology, has three roll changers 02, two printing units 03, as well as a folding apparatus 04. The parameters from the object stock 19, which are schematically represented on the right side of the figure, are assigned to each unit 02, 03, 04, 05. Following the selection of the components/objects intended for the installation 01, all of the assigned data, parameters/sub-programs, are transferred, in accordance with a predefined pattern, to a data set F or to a file F, such as, for example, a "config file" F. This data set F then represents a map of the installation 01 which is actually to be operated and then has, for example, all of the preset values, preset command variables, and the like which are essential for the operation and control and which can be available either in text or in binary format.

In an advantageous embodiment of the invention, the projection is performed on the data processing unit 16 which unit 16 is independent from the control system 06 or which can be separated from it, for example on a computer 16. In this case, an embodiment of the invention is of advantage wherein a program surface 18 has a linkage with the above mentioned data bank 17 in such a way that a selection or a copy of an object 12, 13, 14, or of its identification or name also contains the specific data or parameters and/or sub-programs and/or sub-objects 13.1, 13.2 and furthermore also the process variables 12, 13, 14, 13.1, 13.2, 13.2.2, 13.2.2 in a manner comparable to the embedding of an OLE object. An embodiment of the program surface is particularly easy to use, by the use of which objects 12, 13, 14 offered in an object stock 19 in a tree structure can be further differentiated by selection, and the objects 12, 13, 14, or the detailed objects 13.1, 13.2 can be supplied by copying, in particular by "drag and drop", to the installation to be projected in the form of its own display screen area 21. In the background of this operation, or at the end of it, the data and procedures assigned to these objects 12, 13, 14 with lower-order objects 13.1, 13.2, etc. are copied, for example in a predeterminable standard format, to the data set F. The file F, which is created on the basis of the selected process variables 12, 13, 14, 13.1, 13.2, 13.2.2, 13.2.2, can now be fed, after its completion, to the control system 06 of the installation 01, and in particular to the data server 09. The file F contains, for example, application names predetermined by the user, and preferably standardized, as variables.

For one, a data processing operation, or a data processing routine has been advantageously implemented in the data memory 09, which operation or routine is intended to produce a data structure by the use of projection data which, for another, are available to it. In the present case, the configuration file F which had been transferred to it, is available to the data memory 09, by the use of which a software-related configuration or establishment of the memory takes place, which is custom-made for the installation 01 that is mapped by the file F. This means that following the transmission of the configuration file F into the data memory 09, first a data structure is created, which is matched to the installation 01, instead of merely filling an already fixedly programmed memory environment of open parameters with data. Such a fixedly programmed memory environment would have to be individually programmed to a large extent for each machine type and/or for every more extensively differing configuration of the hardware. Because of the advantageous design of the data memory 09 with a data processing operation and a configuration file F assigned to each other, the custom-made configuration of the data structure, and, in the end, of the control system 06, is possible, in a simple way. The actual installation 01 is mapped in accordance with fixedly predetermined routines of the data processing operation by use of the file F, containing process variables 12, 13, 14, 13.1, 13.2, 13.2.2, 13.2.2, in the data memory 09 or in the control system 06. Only then is the data and program structure formed as a system of the data memory 09 as such.

The advantage of this double solution is that, on the one hand, procedures, actions, behavior and/or logical connections have been set up for the software portion and for the higher-order control processes. On the other hand, the configuration data of the file F defines the components and the sub-routines of the actually existing installation 01. In this way, changes or error corrections of the "hardware" can be achieved solely by implementing a new file F, and improvements or error corrections of the data processing operation can be achieved solely by implementing a portion of, or the entire data processing operation. For example, in case of an additional unit or of a replacement unit of a new type, it is only necessary to read in a new config file F for the new installation 01, taking this change into consideration. The program portion of the data server 09 recognizes the mapped installation 01 and adjusts its memory area and, if required, also adjusts other components of the control system 06, accordingly. In this case, no change in the program source codes, with respect to parametrization, routines, etc., needs to be made. The program portion, or the data processing operation, is designed in such a way that the data structure and the functionality of the installation 01, regarding different machine types, is formed solely by the available config file F.

The above-described projection goes far beyond the conventional programming of a control console computer or a section computer wherein, although the installation 01 is also mapped by software, the routines and the program source codes containing the parametrization are, in a manner tightly matched to the machine, fixedly programmed in the respective computer unit. The installation 01 can then be operated via an operator interface. This means that customarily already entered components can be switched on and off by use of software, parameters can be changed, and the like. In the prior art, this is also sometimes called "configuring the installation 01", but means the selection of components and/or parameters which are already fixedly set in the program, and not the "configuration by use of software" of the data server 09 or of the control system 06 in the manner which is called "projecting" here. In contrast to the so-called "configuration of the installation 01", wherein the operating data in a fixedly preset data structure are selected and are thereby "configured", with the present way of operating, the data structure of the data server 09 itself is configured, i.e. the data server 09 itself is designed so it can be configured or projected. Projection is to be understood as the mapping of the actually existing units, and only these units, in an appropriate data structure.

In an advantageous embodiment of the present invention, it has, of course, been provided that, following the projection and the implementation of the file F, the operators can switch units, which are implemented through an interface 15, off or on, or can change parameter values via a control level 41, as will be described below, and/or a partially or fully automated system, such as a product planning system, i.e. can perform a so-called "configuration of the installation 01" in the above mentioned way from the units now entered in the data server 09.

In an advantageous further development of the present invention, in the course of projecting the installation 01, communication-specific information, such as, for example, interface protocols used, regarding the units 02, 03, 04, 05, and, if required, regarding the hardware components of the control system 06 used, are read out of the object stock. In a first variation, this data can be integrated in the config file F, can also be implemented in the data server 09 and can be fed from there to a communication server 23, which will be explained in greater detail below, for its "configuration by use of software". In an embodiment of the invention, which is indicated by dashed lines in FIGS. 2 and 3, for the configuration by use of software of the communication server 23 in the course of the projection, at least one second file F', such as, for example, configuration file F', or config file F' for short, is established, which second file is either indirectly implemented in the communication server 23 via the data server 09, or via an interface, which is, not specifically represented, of the communication server 23. Communication-specific information regarding the projected units 02, 03, 04, 05 is then available to the latter.

A systematy, leading away from a one-time production, is created by the procedure and by the embodiment for setting up the control system 06, which can be used in connection with the most diverse products of a manufacturer of the installation 01, such as, for example, different types, product lines and configuration or equipment stages, in a manner which is uncomplicated and which is low in errors. The person projecting the control system 06 by the use of the planned installation 01, no longer needs to perform detailed programming, custom-tailored to the installation 01, but instead only maps the components or the units 02, 03, 04, 05 of the installation 01. Programming takes place by taking in the data regarding the object stock 19, the implementation in the data server 09, as well as the program portion of the data server 09 which is substantially constant regarding the different types, product lines and design or equipment stages.

The data memory 09 is advantageously configured as a data server 09 with an open interface, and in particular is configured as a data server 09, or as an OPC data server, with at least one open OPC interface 15 for data exchange on the basis of OLE/COM and DCOM. The data memory 09 manages the objects or the process variables 12, 13, 14, 13.1, 13.2, 13.2.2, 13.2.2 on the basis of an object management, for example in accordance with the COM (component object model)/DCOM (distributed component object model) standard. This means that it has an operating system which supports a method for inter-process communication, or an object request mediator, which is configured to exchange complex data structures. In the example, the operating system is provided in the form of Windows NT4.0®, or higher, or Windows 2000®, or higher and as standard for COM/DCOM communication. However, it can also be a comparable combination of an operating system and an object request mediator meeting the above mentioned conditions, for example the operating system LINUX® and the standard CORBA®, can be used. This also applies to the element to be described in what follows, for which the use of Windows 2000® together with COM/DCOM has been called advantageous or a requirement.

The data can be exchanged via the open interface 15 in accordance with the data exchange method OLE, or object linking and embedding, for example with a network, a field bus, an application and/or a visualization. The at least one open OPC interface 15 allows access by use of a further external unit 20, module 20 or application 20, for example of a dryer, a print pre-stage and/or a roll supply, also called a "consumer" in what follows in that it is brought into contact with, and is connected with the data server 09. The additional consumer "helps itself" autonomously to the data from the data server 09.

The objects, or the process variables 12, 13, 14, 13.1, 13.2, 13.2.2, 13.2.2 are mapped by the data server 09 in an identifier space and are managed. The administration can consist, for example, of memorizing, archiving and reconstructing process data and process variables 12, 13, 14, 13.1, 13.2, 13.2.2, 13.2.2. The identifier space is now specifically configured to correspond to the projected installation 01, particularly again in a tree structure. The data server 09 can additionally be configured so that errors which are detected in the control and/or in the regulation of the installation 01 are entered in a data set, such as, for example, a so-called log file.

Figure 3:
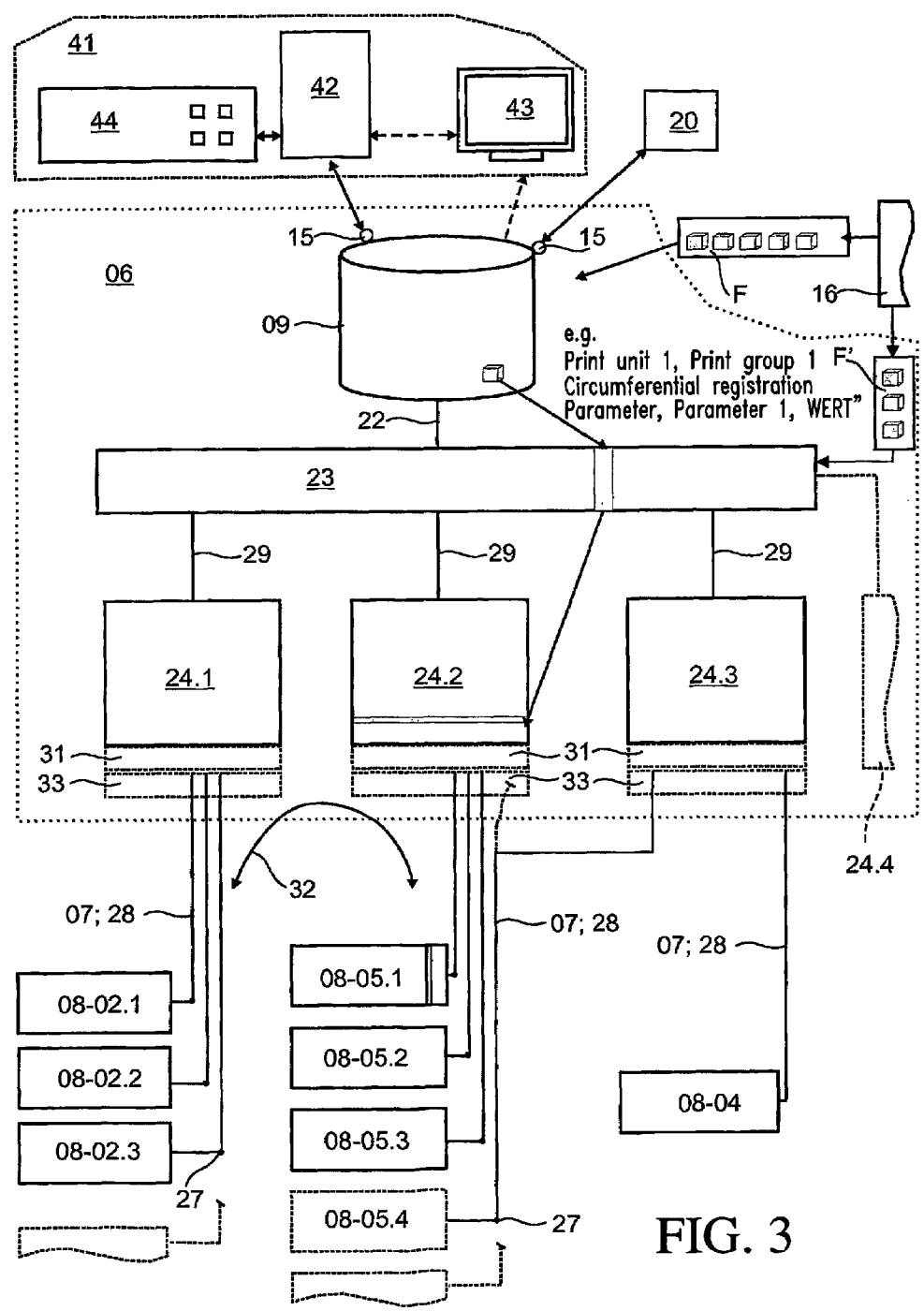

In an advantageous embodiment of the present invention, the data server 09 is integrated into an architecture for the control system 06, as will be explained in what follows, and as seen in FIG. 3.

The data server 09 is connected, via a further interface and a signal connection 22, such as, for example, via a network 22, with at least one process or computing unit 23, for example a server 23, and in particular with a communication server 23. With regard to the control system 06 with decentralized components, such as, for example, with lower-order processes 24 and/or controls 08, as discussed below, the process or computing unit 23 represents a higher-order process or computing unit 23. In it, a conversion of the so-called raw data, which was made available by the data server 09, into the communications protocol demanded for the lower-order processes 24 and/or the controls 08, respectively takes place in it in a higher-order process. The network 22 between the data server 09 and the higher-order process or computing unit 23 is, for example, configured as an ethernet with a transmission rate of at least 10 Mbits, for example. Unless stated differently, a "network" is understood to be a closed network in accordance with hardware technology of a uniform net type. In an advantageous embodiment of the invention, a stochastic access method, and in particular, the CSMA/CD access method, standardized in accordance with IEEE 802.3, is used as the access method. In principle, the communication can be based on diverse protocols, but in accordance with an advantageous embodiment of the present invention on the TCP/IP protocol or a socket connection.

The communication server 23 is generally understood to be a process unit 23, which is a mediating layer between the server 23 and the network-specific processes which are located "below" it. For example, the server 23 here functions as client, OLE or COM/DCOM client, which can pick up objects or process variables 12, 13, 14, 13.1, 13.2, 13.2.2, 13.2.2 from the data server 09, or OLE server. It receives and/or processes the objects or the process variables 12, 13, 14, 13.1, 13.2, 13.2.2, 13.2.2 also on the basis of an object management in accordance with the COM/DCOM standard and is machine-specifically configured. The communication server receives the machine-specific configuration, for example in the above mentioned way, through the projected config file F'.

Thus, the server 23 forms a "communication layer" between the data server 09 and clients which are located "below it". These clients can be, for example, one or several controls 08 which may be combined into one or into several networks 28 and which are connected, for example, via appropriate interfaces 27 or nodes 27, with the respective network 28 or with the signal connection 28. The server 23 constructs, for example, a direct signal connection, which is not specifically represented, with these controls 08 used as communication partners, or maintains that connection. On the one hand, the server interprets data or work order or "jobs" received from the control 08 and transfers these data to the data server 09. On the other hand, it converts data to be transmitted from the data server 09 into jobs and transmits these to the respective one of the controls 08. The controls 08 can be configured as programs running on a PC, as SPS units, or in another way. The job receives, from the server 23, the information regarding the node 27 affected by the job, for example in the head of the respective network protocol.

The signal connections 28 are advantageously configured as one or more networks 28. They can lead in a star shape, as represented in star topology, to the controls 08, or in a manner which is not specifically represented, each can serve several controls 08 in a bus or ring structure.

The network 28 is embodied, in an advantageous manner, as a network 28 with a deterministic access method, which is, in particular, based on token-passing, such as, for example, as an arc net 28. In this case, the server is embodied for converting the jobs into the protocol used. If the network 28 is embodied as an arc net 28, the communication server 23 is configured as an arc net server. In an advantageous variation of the present invention, the connection 28 can also be configured as a so-called "profi bus system".

In the preferred embodiment of the present invention, as shown in FIG. 3, the server 23 is not in a direct signal connection with the controls 08, but instead, in an advantageous manner, is in connection via several lower-order processes 24 or data processing and/or computer units 24, specifically three in this depicted configuration. The processes 24, or also the process units 24 can be housed, as represented in FIG. 3, in separate units 24.1, 24.2, 24.3, 24.4, i.e. in their own processors, such as, in particular, communication processors, or even in their own housings or computers, or in a common component, such as, for example, a computer. The processes 24 are embodied to serve a network of a defined type and constitute so-called "net handlers" 24. The net handlers 24 are interchangeable and can be embodied depending on the net type to be served, such as, for example, profi bus, interbus-S or real time ethernet. Net handlers 24 of several different types can also be connected at the same time with the server 23. For example, in the depiction in FIG. 3, the three net handlers 24.1, 24.2, 24.3 can be configured as arc net handlers, while an additional net handler 24.4 supports another net type and/or another protocol, for example, in order to communicate with units, or with their controls 08, on the basis of this net type and/or protocol.

A connection 29 between the server 23 and the lower-order data processing and/or computing units 24 is configured, for example, as a network 29, here in star topology. The information as to which node 27 is in a signal connection 29 with which lower-order data processing and/or computing unit 24, or processes 24, for example, has been implemented in the server 23. The information is then sent, for example in the manner of a "switch", to the lower-order process 24 concerned. In a variation, all of the information is sent to all of the lower-order processes 24, wherein acceptance and further processing is decided, for example, by use of the information in the protocol head. The information regarding which control 08 is to be addressed over which lower-order data processing and/or computing unit 24 or process 24, can be implemented in the lower-order control 08 itself and can be changed.

In the example depicted in FIG. 3, the network 28 is embodied between the lower-order data processing and/or computing unit 24 and the connected control 08 as a network 28 in star topology. The lower-order data processing and/or computing unit 24 is configured, for example, as server 24 with COM/DCOM object management. In a further development, each server 24 contains a program 31, configured as a driver 31, or as driver software 31, which supports the operating system NT4.0®, or higher, or Windows 2000®, or higher. In this way, object-oriented processing, with COM/DCOM object management, is made possible on all levels, corresponding to the above mentioned LINUX/CORBA or comparable system. A switch 33, a so-called switch 33 or a switching hub, can be arranged downstream of the data processing and/or the computing unit 24, which switch 33 evaluates the target address of the data packet, here the control 08 or the node 27 concerned, and passes the data packet on specifically only to this control.

In addition to the general connection between the data server 09 and the individual controls 08, logical connections 32 between the controls 08 with "short" logical paths are provided as cross communication. These are used for communication during the control process, in which no jobs are needed from the data server 09.

The represented architecture now makes it possible to configure the installation 01 in a simple manner during planning, or to project the control system 06 corresponding to the installation 01, and to implement the resulting settings and data via the data server 09 for the operation. The embodiment of the present invention, with several lower-order data processing and/or computing units 24, makes it possible to couple the different controls 08 freely and arbitrarily to one of these data processing and/or computing units 24, and to store this information there, if required. Depending on the load, possibly in connection with interferences, or in the course of expanding the installation 01, the controls 08 can be assigned to the different, or to one data processing and/or computing unit 24 to be expanded, or to a further process 24. Therefore, the concept of the present invention can be freely upwardly scaled. If the installation 01 is in the planning stage, it is possible, in the course of projecting, to decide on the number of the lower-order data processing and/or computing units 24 or net handlers 24, for example as arc net handlers, as well as the intended assignment of the controls 08, and to already take them into consideration in the file F, or in a separate configuration file for the data processing and/or computing units 24. A presetting is then already implemented in the server 23 and/or the net handlers 24, which presetting is simultaneously taken into consideration in the network plans for the connections. It is of particular advantage that, independently of the multitude of the units 02, 03, 04, 05, all of the basic settings, the actual values needed for control and the new command variables of a section are implemented in the common server 23, or changed data are stored there. The control level 41, as well as the lower-order systems, can always access this data stock via the represented architecture.

Figure 4:
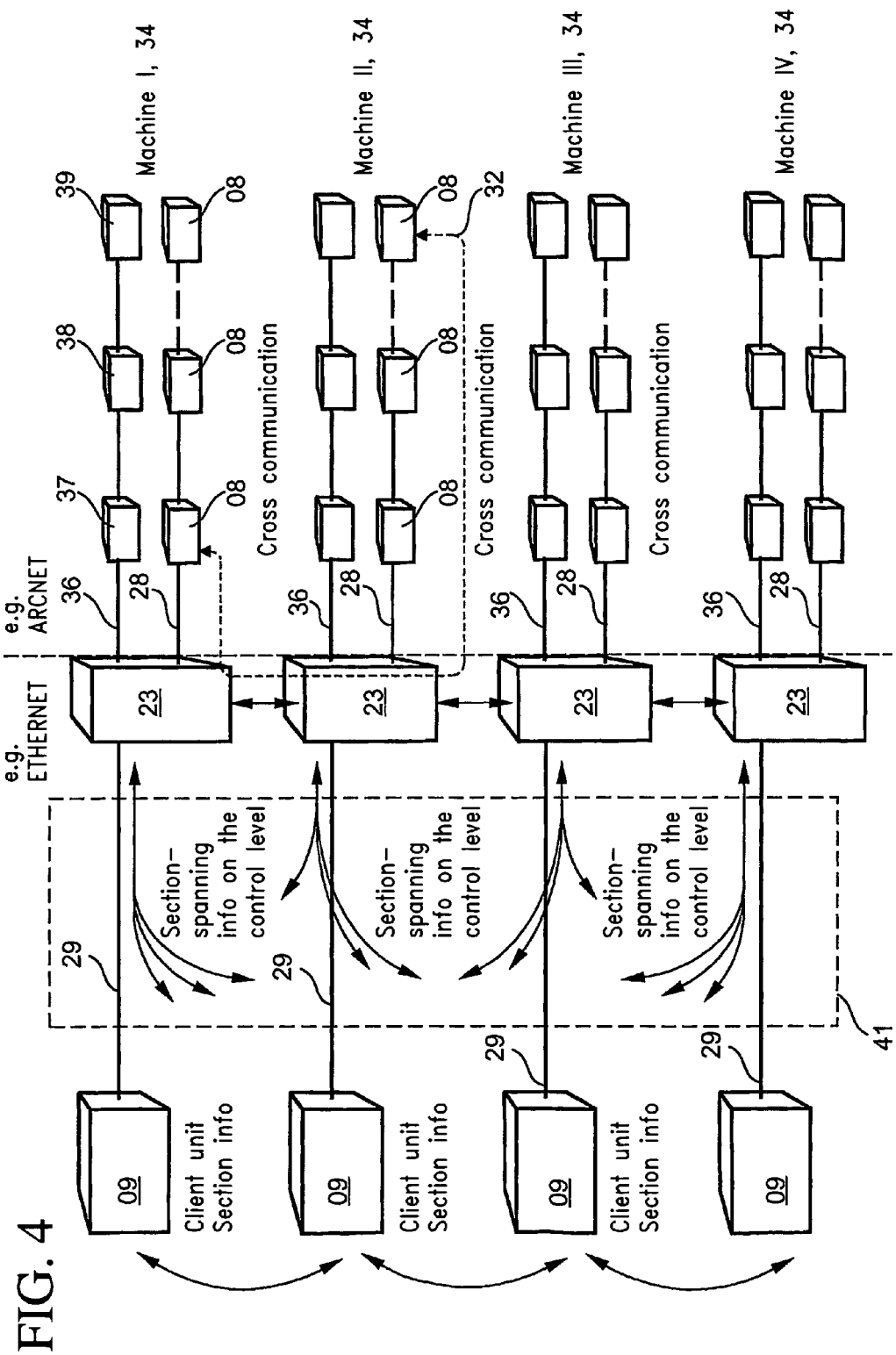

In a further development of the present invention, as represented in FIG. 4, the previously mentioned concept can be expanded to an installation 01 with several sections 34, basically machines 34, which can be operated independently of each other. In this application, the installation 01 has several data servers 09, for example one for each machine 34 or section 34. The data servers 09 are each connected via networks 29, such as an ethernet, in the present example, with a communication server 23. Further lower-order data processing and/or computing units 24 or net handlers 24, which are not specifically represented here, can be assigned to each communication server 23. The controls 08 are again in signal connection with the communication server 23, either directly or via a lower-order net handler 24 via a network 28. In the subject example, a second network 36 for each machine 34 is provided, into which second network 36 further control or operation-relevant devices 37, 38, 39 can be integrated.

The data processing units 23, which are here depicted as arc net servers 23, are in signal connection 32 with each other for communication. It has furthermore been provided in accordance with the present invention that a section-overlapping information exchange between the various data servers 09 and the communication servers 23 takes place on a control level 41 of the installation. As in the example in accordance with FIG. 3, it is furthermore provided that a cross-communication 32 between the controls 08 within a section 34, and/or in a section-overlapping manner, can take place on the level between the communication servers 23 and the controls 08.

The control level 41 of the installation 01 is symbolically indicated in FIG. 3 in dashed lines above the control system 06. The components of the control level 41 are a control console 42, 43, 44, which, for example, has at least a computing or a data processing unit 42, such as a control console computer 42, a visualization device 43, such as a display screen 43, as well as an operating console 44. The control console 42, 43, 44 is used for the communication of the operators with the installation 01, or with a section 34 of the installation 01. The control console 42, 43, 44, or portions of the control console 42, 43, 44, are in signal connection with the data server 23, for example via an open OPC interface in accordance with the above explanations.

While preferred embodiments of a control method and device and method for setting up a control system, in accordance with the present invention, have been set forth fully and completely hereinabove, it will be apparent to one of skill in the art that various changes in, for example the specific types of printing presses, their drive mechanisms and the like could be made without departing from the true spirit and scope of the present invention which is accordingly to be limited only by the appended claims.

What is claimed is:

1. A device for controlling a printing press, said printing press having at least one unit embodied as a material feeding device adapted to feed a material to be printed, at least one unit embodied as one of a printing unit and a printing group to print on said material received from said material feeding device and at least one unit embodied for farther processing of said material printed on by said one of said printing unit and said printing group, said device comprising:
    at least one separate control element for each one of said at least one unit embodied as a material feeding device, said one of said printing unit and said printing group and said at least one unit for further processing of said material;
    a common control system assigned to a plurality of said separate control elements of said units, said common control system having a central data memory with an identifier space, in which up-to-date actual values and/or up-to-date command variables are stored in the form of process variables, said central data memory being connected to said plurality of said separate control elements by at least one communications layer embodied as one of ah higher order process unit and a computing unit; and
    wherein said central data memory has a memory area for said process variables, each of said process variables having a data structure that is designed with the use of a data set describing a projected installation for said printing press, and said central data memory is a data server that employs object management in accordance with an object model standard.

2. A device for controlling a printing press, said printing press having at least one unit embodied as a material feeding device adapted to feed a material to be printed, at least one unit embodied as one of a printing unit and a printing group to print on said material received from said material feeding device and at least one unit embodied for further processing of said material printed on by said one of the said printing unit and said printing group, said device comprising:
    a common control system assigned to several ones of said at least one unit embodied as said material feeding device, said one of said printing unit and said printing group and said at least one unit for further processing of said material, and said control system having a central data memory with an identifier space, in which up-to-date actual values and/or up-to-date command variables are stored in the form of process variables;
    a process unit or a computing unit designed as a communication server to which said central data memory is connected with a signal connection;
    at least one lower-order process unit to which said communication server is connected, each of which is designed to server a network of defined type; and
    at least one control element for one or more of said printing press units to which said at least one lower-order process units is connected.

3. The device of claim 2, wherein said central data memory has a memory area for said process variables, each of said process variables having a data structure that is designed with the use of a data set describing a projected installation for said printing press.

4. The device of claim 2, wherein said process unit or said computing unit is embodied as a higher-order communication server.

5. The device of claim 4, wherein said higher-order communication server has communication-specific information regarding the printing press units.

6. The device of claim 5, wherein said communication-specific information is implemented in the communication server via an interface using a configuration file.

7. The device of claim 2, wherein said signal connection is implemented with at least one network.

8. The device of claim 1, wherein basic settings of the process variables are implemented in the central data memory via the data set.

9. The device of claim 1, further comprising a control console from which said process variables in said central data memory can be read and/or refreshed.

10. The device of claim 1, wherein said central data memory is designed as a data server with at least one open interface.

11. The device of claim 1, wherein said central data memory is designed for supporting an inter-process communication with an exchange of complex data structures.

12. The device of claim 10, wherein said interface is designed for supporting an inter-process communication with an exchange of complex data structures.

13. The device of claim 2, wherein said central data memory is a data server that employs object management in accordance with an object model standard.

14. The device of claim 2, wherein said process unit or said computing unit is designed for supporting an inter-process communication with an exchange of complex data structures.

15. The device of claim 2, wherein said process unit or said computing unit processes objects or process variables on the basis of an object management in accordance with an object model standard.

16. The device of claim 2, wherein said process unit or said computing unit is connected with several of said lower-order process units, which in turn are each connected with one or with several of the plurality of control elements.

17. The device of claim 2, wherein said lower-order process unit is a server, which supports an inter-process communication with an exchange of complex data structures.

18. The device of claim 2, wherein said lower-order process unit conducts inter-process communication on the basis of an object management in accordance with an object model standard.

19. The device of claim 2, wherein said at least one lower-order process unit is embodied as an arc net handler.

20. The device of claim 2, wherein said central data memory, said process or computing unit and/or said lower-order process unit have an operating system, which supports a method for inter- process communication that is designed for the exchange of complex data structures.

21. The device of claim 2, wherein several of said lower-order process units based on different network types and/or protocols are provided that are connected with the higher-order process or computing unit, each of which, in turn, is in respective signal connection with the printing press units based on these different network types and/or protocols.

22. The device of claim 1, wherein a program section is provided in said central data memory, by means of which set-up of the data structures for the process variables matched to the projected installation is performed using the data in the data set.

23. The device of claim 1, wherein said identifier space is freely configurable to store project installation layout and its associated data sets.

* * * * *